Figure 1A:
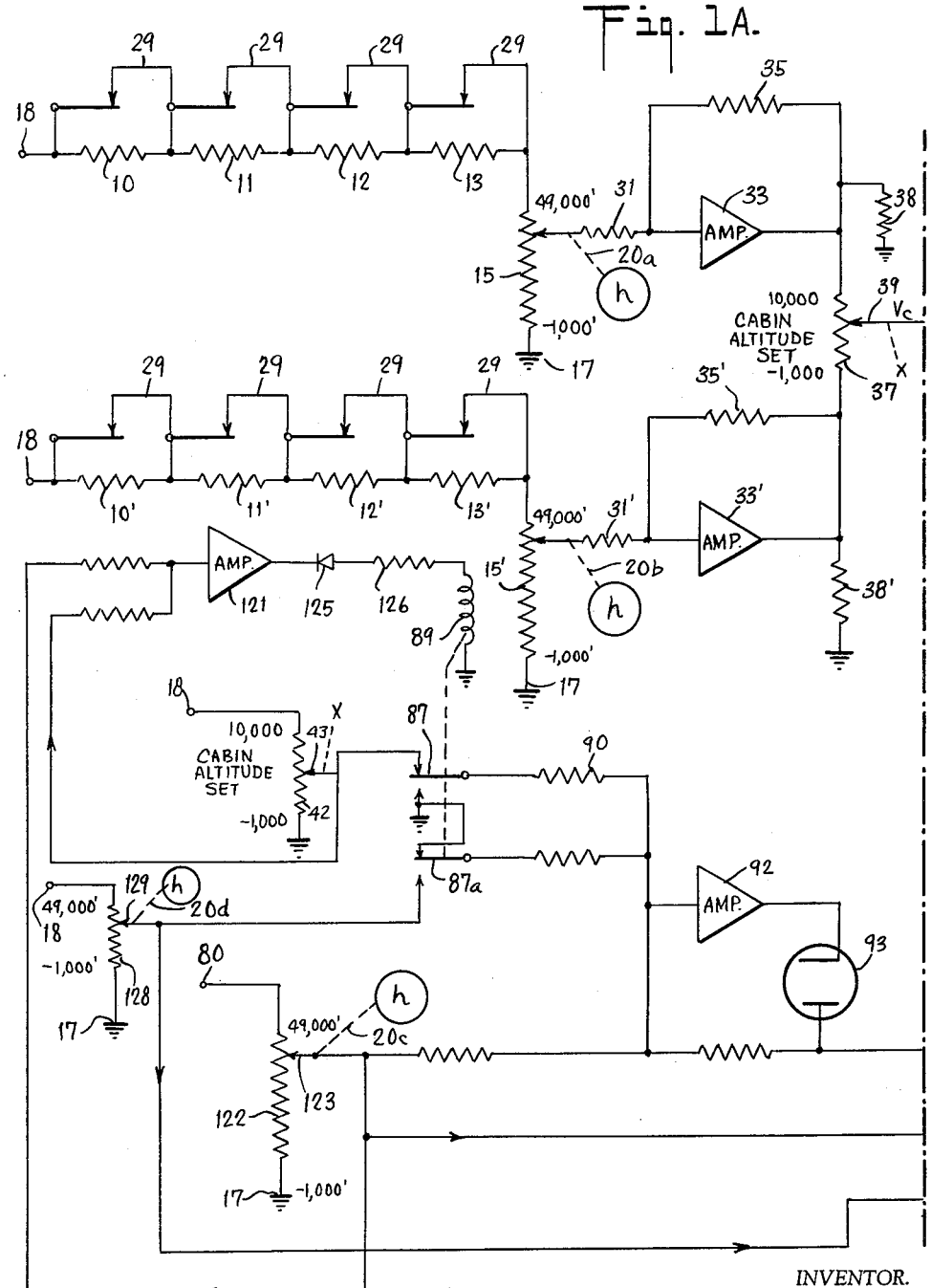

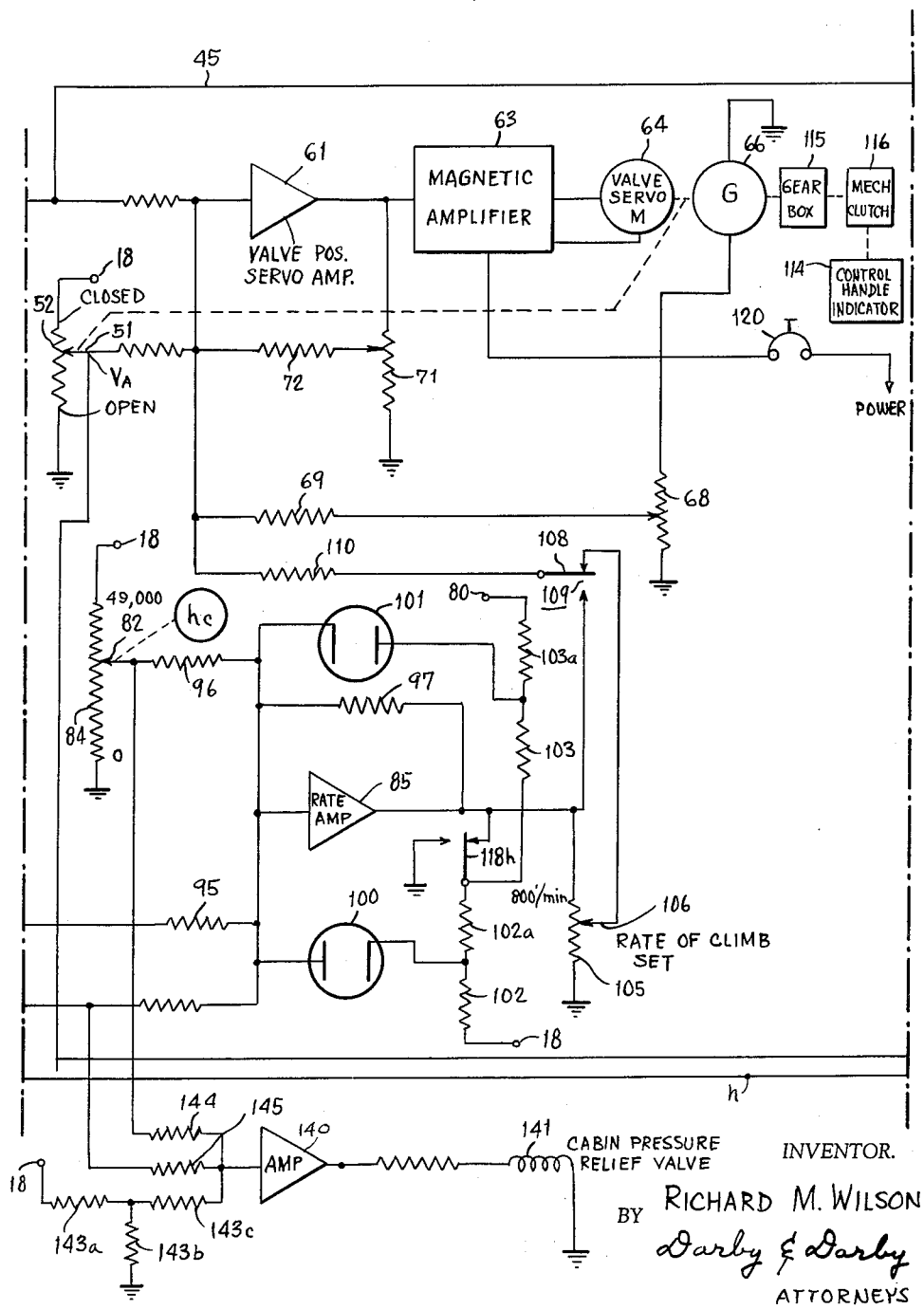

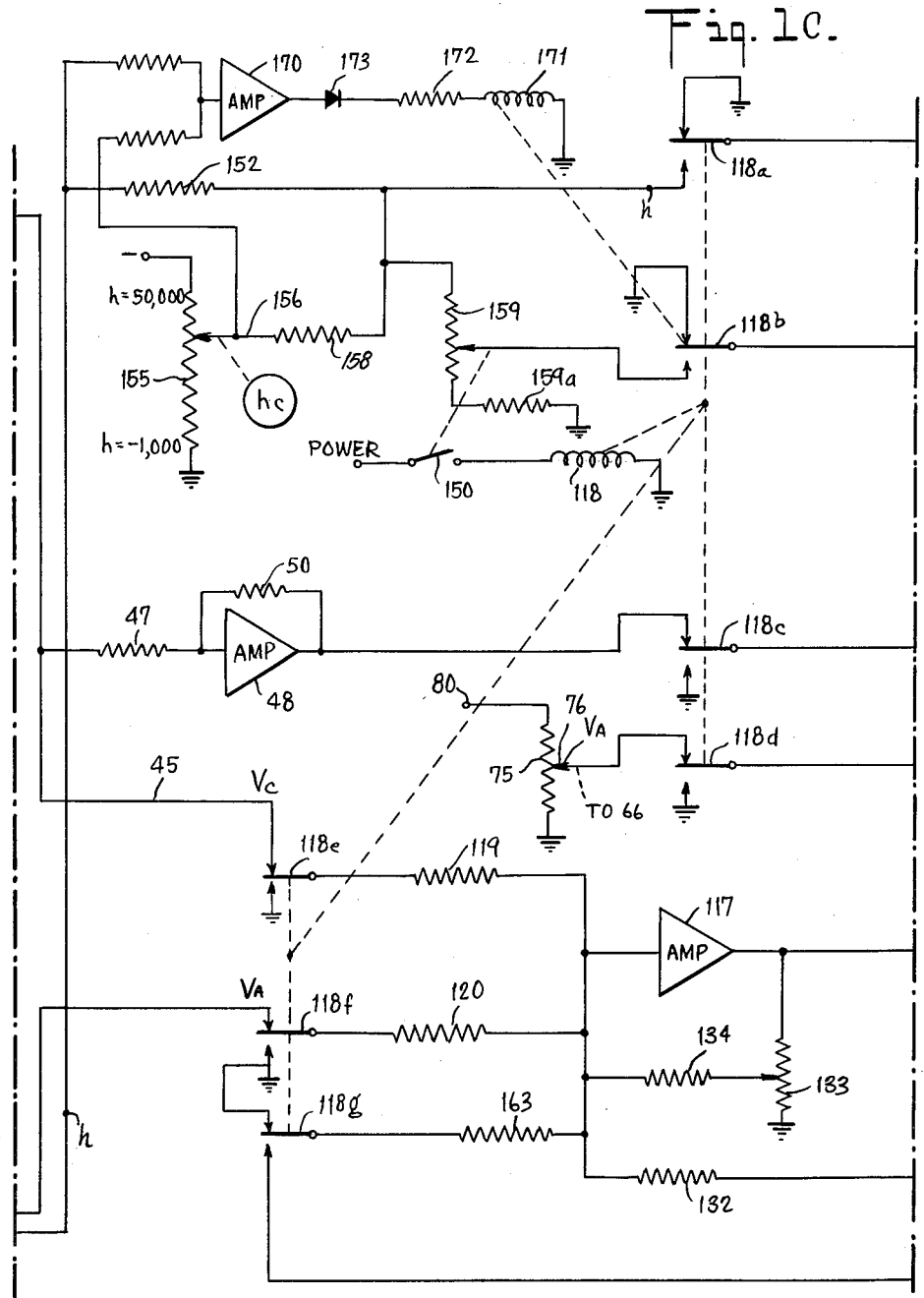

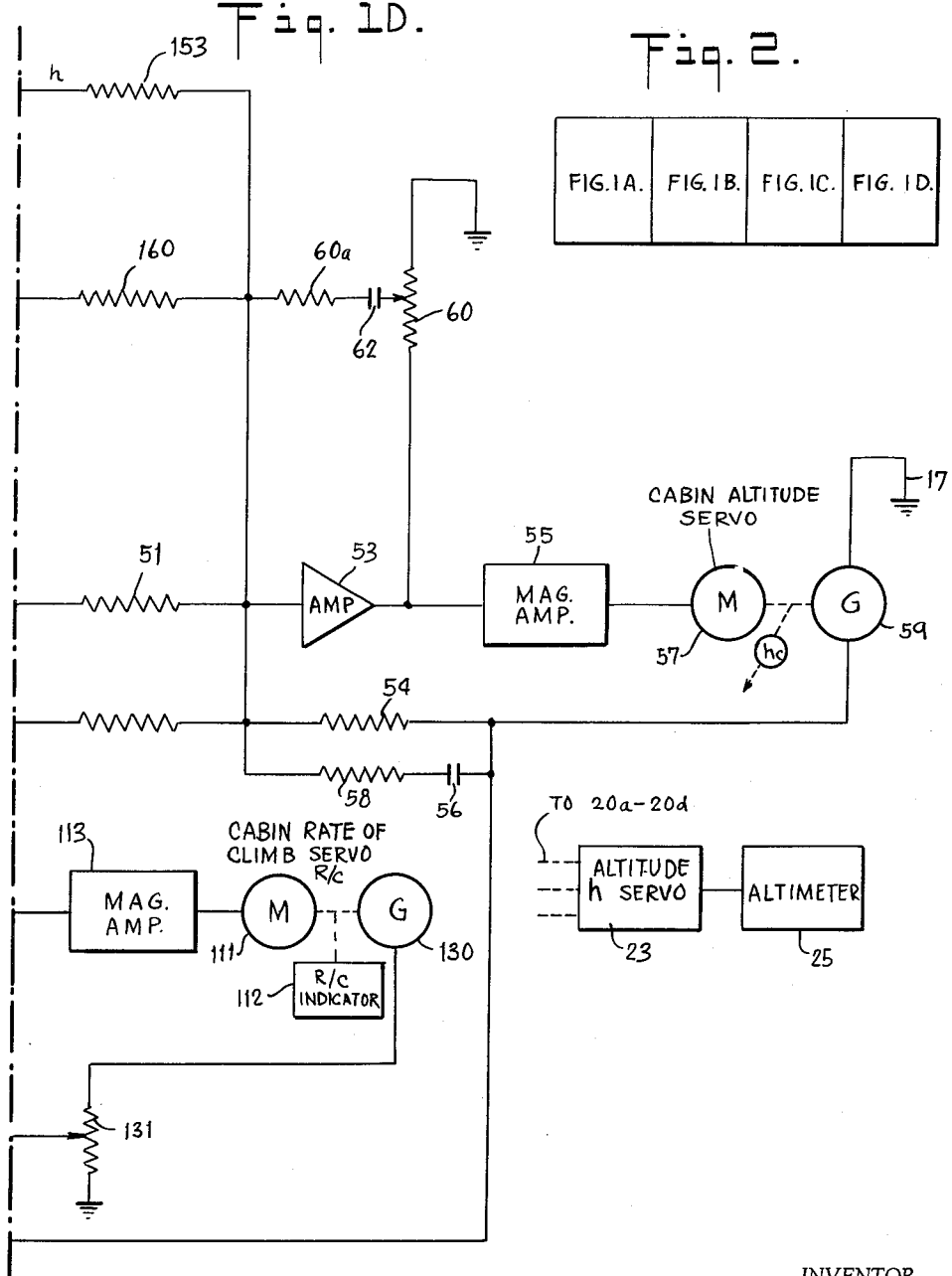

3,039,206
CABIN PRESSURIZATION SYSTEM
Richard M. Wilson, Marathon, N.Y., assignor to General
Precision, Inc., a corporation of Delaware
Filed June 2, 1959, Ser. No. 817,574
21 Claims. (Cl. 35—12)

This invention relates to aircraft simulator systems and more particularly to a training aid for simulating an aircraft cabin pressurization system in which a variable outflow valve is used to regulate the aircraft cabin pressure.

As is well known, atmospheric pressure decreases with an increase in altitude above sea level. An aircraft flying a flight pattern at various altitudes experiences a variety of pressures and the passengers in the aircraft are subject to the pressures at the various altitudes. In order to economically operate modern passenger aircraft, such as turbo-jets or straight jets, it is necessary to fly them at high altitudes. At these high altitudes the atmospheric pressure is so low that the passengers experience serious discomforts or physiological safety hazards. In order to overcome the passenger discomfort and safety hazards and still be able to fly the aircraft at the desired high altitude, a pressurization system is used to pressurize the cabin of the aircraft in which the passengers are located to some level of altitude which the passengers can withstand safely. By pressurizing the aircraft cabin, an artificial altitude is established therein with respect to the actual altitude of the aircraft.

Several types of cabin pressurization systems have been developed. One such type of system uses air compressors of the variable load type which supply a variable amount of air to the aircraft cabin, in accordance with the actual aircraft altitude, thereby varying the cabin pressure. In another type of cabin pressurization system, the air compressors deliver a substantially constant quantity of air to the cabin and a variable position outflow valve is provided. The position of the outflow valve regulates the amount of air which is let out of the cabin and therefore controls the cabin pressure. In the latter type of system, for example, assuming that the aircraft air compressors are delivering a fixed quantity of air, if the valve is kept closed the pressure inside the cabin rises, thereby establishing a lower altitude in the aircraft cabin. If the outflow valve is open, so as to allow the escape of air from within the cabin, the pressure drops, thereby establishing a higher altitude in the cabin. The present invention is directed to a simulator for a cabin pressurization system of the outflow type.

In constructing pressurization systems for aircraft, several factors must be taken into consideration. One factor is the altitude pressure at which the cabin is to be held regardless of the actual aircraft altitude. This altitude is called the cabin altitude and is selected by one of the aircraft flight crew. The cabin altitude is usually maintained at a pressure corresponding to an altitude somewhere between zero and 7,600 ft. above sea level in order to maintain passenger comfort and safety and to avoid overloading the air compressors of the aircraft pressurization system.

To maintain a selected cabin altitude of between zero and 7,600 ft., the outflow valve must be positioned as the aircraft changes its altitude so as to keep the proper quantity of air in the cabin which is necessary to maintain the pressure of the selected cabin altitude.

Another factor to consider is that as the actual aircraft altitude increases the pressure differential between the pressure at the selected cabin altitude and the outside air pressure increases, since the actual atmospheric pressure outside of the aircraft decreases as the aircraft altitude increases. In order to prevent any aircraft pressure "blowouts" which might occur due to too great a pressure differential, the pressurization system must be designed so as to maintain a maximum pressure differential no greater than is consistent with the structural limitations of the aircraft.

Another factor which must be considered in the design of the pressurization system is the rate at which the cabin altitude is to change as the aircraft is ascending or descending in altitude. It has been found that the maximum rate of cabin altitude change should not exceed 800 ft. per minute, when the aircraft altitude is either climbing or descending, in order to avoid any passenger injury or discomfort. In actual flying conditions, this rate of cabin pressure change, or cabin rate of climb as it is called, is also pre-set into the controls of the aircraft pressurization system by one of the crew members. If when the aircraft is climbing or descending at a rate which is slower than the rate of change of climb set into the pressurization system, it is desirable to change the cabin altitude at this slower rate so that the passengers will not be subjected to any unnecessary discomfort even though the pre-set rate of climb is below the maximum safety limit.

In aircraft which use the variable position outflow valve pressurization system, the position of the outflow valve may be controlled either automatically or manually. When the pressurization system is set to operate automatically, the position of the outflow valve is primarily a function of the aircraft altitude. This is true because the amount of air supplied by the compressors is substantially constant at all times and a constant cabin pressure is desirably maintained. Therefore, as the aircraft altitude changes, the position of the outflow valve must also change to keep the cabin at the pre-set constant pressure by allowing a different amount of air to escape at different altitudes. In automatic operation of the pressurization system, the establishing of the pre-set cabin altitude is accomplished at a rate which is determined by the cabin rate of climb pre-set into the pressurization system by the aircraft crew member.

When the pressurization system is manually operated, the position of the outflow valve is controlled by one of the crew members, for example by adjusting a valve control handle, which may also serve as a valve position indicator in both manual and automatic modes of operation. When the pressurization system is in the manually controlled mode of operation the aircraft altitude has no effect upon the outflow valve position. In this type of operation, in order to change the cabin rate of climb, the crew member has to continually adjust the control handle. This adjustment must be made at a constant rate if it is desired to maintain a constant rate of climb.

The present invention relates to a ground training aid, which simulates an aircraft pressurization system of the variable position outflow type which allows the training of crew members of an aircraft on the ground, under the guidance of instructors, at a cost which is considerably less than the cost of actually flying the aircraft for training purposes.

The simulator of the present invention is an electromechanical system which simulates an aircraft cabin pressurization system of the variable position outflow valve type described above. In the system of the present invention, this is accomplished by the use of electrical signals produced by servomechanism devices which simulate the cabin pressurization system controls, aircraft altitude, and the position of the outflow valve. These electrical signals are in turn used to perform functions which are representative of the operation of a pressurization system of an aircraft under actual flying conditions.

It is therefore an object of this invention to provide a simulator for an aircraft cabin pressurization system.

Another object of this invention is to provide a simulator for the outflow valve type of cabin pressurization system.

Yet another object of this invention is to provide a system for simulating the position of the outflow valve of an aircraft cabin pressurization system so that the cabin altitude and the cabin rate of climb may be determined.

Other objects and advantages of the invention may be determined upon consideration of the following specification and annexed drawings in which FIGURES 1A–1D, when taken together in the manner shown in the box arrangement of FIG. 2 form a schematic representation of the simulator system of the present invention; and FIGURE 2 shows the layout of FIGURES 1A–1D.

In accordance with the objects of this invention, a training aid is provided for simulating an aircraft cabin pressurization system of the outflow valve type. The present invention may be used to simulate either automatic or manually controlled pressurization system operations in which one or more compressors are operating.

As has previously been pointed out in the actual aircraft pressurization for which the simulator is designed, the outflow valve position is a function of the aircraft altitude, the number of compressors operating and the desired cabin altitude. When the cabin altitude has stabilized to the pre-set altitude which was selected, the outflow valve is positioned so that a sufficient amount of the air supplied from the compressors is allowed to escape and therefore the cabin altitude is held constant. At any aircraft altitude, other conditions remaining constant, there is only one valve position which maintains a constant cabin altitude. For any other valve position the cabin altitude either increases or decreases.

As previously stated, the desired cabin altitude and cabin rate of climb are set into the pressurization system by one of the flight crew members. As the aircraft climbs, the cabin altitude changes at the pre-set rate or by the actual rate of climb of the aircraft, whichever is less. When the pressure in the cabin equals the pressure of the altitude to which the cabin is set the pressurization system holds the cabin at this altitude by repositioning the outflow valve. The repositioning of the valve is accomplished by a system which, in the automatic mode of operation, is controlled by signals derived from physical measurements which are made of the aircraft altitude, and cabin altitude by suitable instruments such as altimeters and pressure gages. The cabin is held at this altitude until a predetermined safe differential pressure exists between the pressure at the cabin altitude and the pressure at the actual aircraft altitude. When the maximum safe differential pressure is reached, the valve is repositioned to increase the cabin altitude at the same rate as the aircraft rate of climb, thereby decreasing the cabin pressure and holding the differential pressure constant. When the aircraft dives or makes a gradual descent, the cabin altitude decreases at the same rate of descent by repositioning the valve thereby holding the differential pressure constant until the pre-set cabin altitude is reached. The cabin holds the pre-set altitude until the aircraft reaches the pre-set altitude at which time the valve is operated in a manner so that the cabin altitude follows the aircraft altitude down.

All of the functions of the aircraft pressurization system previously described are performed by the simulator of the present invention; in a manner to be described hereinafter. In the present invention provision is also made to simulate manual control of a cabin pressurization system. This is accomplished in the aircraft by means of a combination indicator-outflow valve control handle on the flight engineer's console. When the manual control is established the automatic features are disengaged and the cabin rate of climb is determined by the movement of the outflow valve control handle.

As previously stated, with a given quantity of air being produced by the compressors there is only one position for the outflow valve at some aircraft altitude $h$, to maintain a given preset cabin altitude $h_c$. At any one aircraft altitude $h$ the position of the valve can be computed by determining the aircraft altitude $h$ and the altitude $h_c$ to which the cabin is set. This computed valve position is represented by a signal called $V_C$. When the computed valve position represented by the signal $V_C$ is equal to the actual valve position, represented by a signal $V_A$, the cabin altitude $h_c$ is at the preset altitude and the valve position is stabilized. Stated mathematically, the position of the outflow valve for a given cabin altitude is correct when $V_C - V_A = 0$. The rate of climb of cabin altitude operates at a preset rate to equalize the difference between the computed valve position signal $V_C$ and the actual position signal $V_A$ thereby satisfying the terms of the equation and producing the proper $h_c$. When the computed valve position signal $V_C$ for a given cabin altitude $h_c$ does not equal the actual valve position signal $V_A$, the actual valve position is changed at a rate which is determined by the cabin rate of climb control. Therefore, the cabin altitude $h_c$ changes at this rate.

Referring to FIGS. 1A, the computed valve position signal $V_C$ is determined by a schedule which varies as a function of the aircraft altitude $h$. The $V_C$ signals developed by means of two voltage divider networks consisting of fixed resistors 10, 11, 12, 13 and 10', 11', 12', 13' and two variable potentiometers 15 and 15'. One end of each of the potentiometers 15 and 15' of the voltage divider networks is connected to a point of reference potential 17, here shown as ground. The other end of each of the voltage divider networks is connected to a suitable source of potential 18, which is preferably positive with respect to the point of reference potential 17. If desired a negative potential may be used at the points designated 18, if suitable changes are made in the polarities of the potentials in the other parts of the system.

The slider arms 20a and 20b of the respective potentiometers 15 and 15' are mechanically coupled to the output shaft of an altitude servo 23 (FIG. 1D) whose output shaft position represents the aircraft altitude $h$. In an aircraft altitude $h$ is measured by a pitot tube or other similar pressure measuring device or by a radio or radar altimeter and the measured altitude is then displayed on an altimeter. In the simulator, the aircraft altitude $h$ is changed by varying an altimeter 25 which is coupled to a servo 23 thereby varying the output shaft position of the altitude servo 23. The altitude servo 23 may itself be directly adjustable.

The potentiometers 15 and 15' may be wound in such a manner or provided with suitable shunting resistors across various parts thereof so that the voltage tapped off by the slider arms 20a and 20b may vary in any desired manner, for example, linear, hyperbolic, logarithm, or any combination thereof. This allows a computed valve position signal $V_C$ to be produced in a predetermined manner, i.e., a schedule, to meet the requirements of various types of aircraft.

When the position of the output shaft of the altitude servo 23 is changed, the slider arms 20a and 20b of the potentiometers 15 and 15' are moved up and down the length of the potentiometers 15 and 15' thereby tapping off a greater or lesser amount of voltage between the source of positive potential 18 and ground 17. For example, if the output shaft of the altitude servo 23 is at a position such as to indicate a high aircraft altitude $h$, the slider arms 20a and 20b are driven upwards along the potentiometers 15 and 15', thereby tapping off a greater magnitude positive signal. As the altitude servo 23 indicates a lower aircraft altitude, the slider arms 20a and 20b are driven towards ground 17, thereby decreasing the magnitude of the positive polarity signal tapped off. As shown, an altitude of approximately 49,000 feet is represented at the upper ends of potentiometers 15 and 15' and an altitude of minus 1000 feet at the grounded ends. The altitude range shown is arbitrary and is only used to illustrate the upper altitude limit of one type of aircraft using the type of cabin pressurization system which is simulated. The system itself may be designed to simulate any altitudes at any altitude ranges.

A shorting switch 29 is provided across each of the fixed resistors 10, 11, 12, 13 and 10', 11', 12', and 13' of the voltage divider networks. Each of the switches when in the closed position shown, is indicative of one of the aircraft's air compressors operating and delivering its normal value of air. By opening one or more of the switches 29, the scaling factor of each of the voltage dividers is changed. It can be seen that as the switches 29a are opened, less of a voltage is developed between the sliding arms 20a and 20b and ground 17, since there is more resistance in the voltage divider circuit. Effectively, this means that there is not as much air being delivered to the aircraft cabin from the compressors. This is manifested in the simulator by decrease in the signal voltage at the slider arms 20a and 20b.

The voltage tapped off the potentiometers 15, 15' by each of the slider arms 20a and 20b is applied by means of respective resistors 31 and 31' to the respective inputs of two amplifiers 33 and 33', which are schematically represented by the triangular shaped blocks. In a preferred embodiment of the invention, direct current (D.C.) amplifiers are used, however the system may be designed to utilize alternating current (A.C.) signal and corresponding alternating current components. Each of the amplifiers 33 and 33' is provided with negative feed-back by the respective resistors 35 and 35'. The negative feedback is used to stabilize the operation of the amplifiers as is well known in the art. The amplifiers 33 and 33' and the other amplifiers referred to in the specification are well known in the art and may be constructed of any suitable components.

The output signals of the amplifiers 33 and 33' are applied to opposite ends of a potentiometer 37 which forms one portion of the cabin altitude set control. The outputs of the amplifiers 33 and 33' and the ends of the potentiometer 37 are returned to ground 17 by means of respective resistors 38 and 38'. A signal is tapped off of potentiometer 37 by means of the slider arm 39. This signal is the $V_C$ signal which is representative of the computed valve position.

In the simulator, the computed valve position signal $V_C$ varies as a function of the desired cabin altitude which is set into the system by the operator. The cabin altitude set control is formed by two potentiometers 37 and 42. In the embodiment of the invention described the cabin altitude is linearily interpolated between a minimum cabin altitude of minus 1000 feet and a maximum of 10,000 feet, and the potentiometers 37 and 42 are so designated. As previously stated, these values are by way of explanation only and the system is not to be construed as so limited.

The two potentiometers 37 and 42 which for the cabin altitude set control have their respective slider arms 39 and 43 mechanically linked together, as designated at "x," so that the slider arms are simultaneously driven, when the cabin altitude is set. Potentiometer 37 serves to linearily interpolate the schedule of the computed valve position signal $V_C$ for a specified cabin altitude of an aircraft operating under certain conditions. These conditions, e.g. type of aircraft, altitude of aircraft, number of compressors running, output of compressors, etc., are set up by the voltage divider networks which supply the input signals to the amplifiers 33 and 33'. Since the slider arms 20a and 20b are driven by the altitude servo 23, the operating point of a respective schedule, and the $V_C$ signal changes as the aircraft altitude $h$ changes. The signal which is tapped off of the first cabin altitude set potentiometer 37 is the computed outflow valve position signal $V_C$ which tells the outflow valve where it should be on a given schedule at the altitude $h$ of the aircraft.

The signal $V_A$ which is representative of the actual position of the outflow valve at any given instant is developed as follows. A servo loop is formed by a valve position servo amplifier 61, a magnetic amplifier 63, a motor 64 and a generator 66. The output shaft of the motor 64 whose shaft position represents the position of the outflow valve, drives the slider arm 51 of a potentiometer 52 through a mechanical coupling, shown by the dotted line. One end of the potentiometer 52 is connected to the source of the potential 18 and the other end is connected to ground 17. As the slider arm 51 is driven by the output shaft of motor 64 a voltage is tapped off potentiometer 52. This voltage is the $V_A$ signal which is representative of the actual valve position. The generator 66 supplies a feedback signal to the input of amplifier 61 through resistors 68 and 69 in order to assure smooth operation of the servo loop. The input of servo amplifier 61 is also supplied with a feedback signal from its output by means of the resistors 71 and 72.

As previously stated, a major objective of a pressurization system is to maintain a predetermined constant cabin altitude $h_c$. At any given aircraft altitude $h$ there is only one valve position which will establish the desired cabin altitude $h_c$. This valve position is represented by the computed valve position control signal $V_C$ which is derived in the manner previously explained.

In simulating actual flying conditions by means of the instructor controlled altitude servo 23, the computed position of the outflow valve, represented by the signal $V_C$ is variable due to the aircraft changing its altitude. Whenever an altitude change occurs, a new signal $V_C$ is generated. In order to maintain the desired constant cabin altitude, the position of the outflow valve must be changed so that the proper amount of air is allowed to escape, thereby establishing the desired cabin altitude. Stated another way, the signal $V_A$ representative of the new actual valve position must equal the signal $V_C$ representing the new computed valve position or $V_C - V_A = 0$.

When the aircraft altitude is changed by means of the altitude servo 23 $V_C$ now does not equal $V_A$. The outflow valve position signal $V_A$ must be changed so that the cabin altitude remains at the desired constant value. The rate at which the output shaft of the motor 64 is moved determines the rate of change of the $V_A$ signal and therefore the rate at which the cabin altitude $h_c$ changes. This rate is adjustable so as to allow the cabin altitude to change at a rate of preferably between 150 feet per minute to 800 feet per minute, the latter value being the maximum rate permissible to avoid passenger discomfort.

In order to vary the position of the valve, i.e., change the $V_A$ signal, at a predetermined rate, a rate signal is generated. This rate signal is supplied to the valve position servo amplifier 61 along with the $V_A$ and $V_C$ signals to control the rate at which the output shaft position of the valve motor 64 turns when it is moving in the direction to make $V_A$ equal to $V_C$. The rate signal is representative of the rate at which the cabin's altitude changes.

The rate signal is developed in the following manner. The $V_C$ signal at the slider arm 39 is applied over line 45 through resistor 47 to the input of an amplifier 48. The amplifier 48 is of the negative feedback type, having a feedback path through resistor 50. The output signal from the amplifier 48 is applied through a resistor 51 to the input of a servo amplifier 53 and the output signal from the amplifier 53 is supplied to the input of a magnetic amplifier 55. The magnetic amplifier 55 in turn controls the cabin altitude servomotor 57, which is of the integrating type, i.e., runs at a certain speed dependent upon the voltage supplied to it. In order to provide for smoother operation of the servomotor 57 a feedback loop having a generator 59, which is connected to the output shaft of the servomotor 57 and whose generated output voltage is dependent upon the speed of rotation of the motor 57, output shaft is provided. The voltage produced by the generator 59 is fed back to the input of the amplifier 53 through a resistor 54 and a compensating network formed by a capacitor 56 and a resistor 58. The amplifier 53 is provided with output signal feedback by a loop formed by resistors 60 and 60a and capacitor 62.

The input of amplifier 53 also receives the $V_A$ signal from a potentiometer 75 whose slider arm 76 is mechanically linked to the output shaft of the valve position motor 64. One end of the potentiometer 75 is connected to ground 17 and the other end is connected to a source of voltage 80 which is opposite in polarity to the source of voltage 18. As the shaft of the valve servomotor 64 rotates, moving the slider arm 76, a different $V_A$ voltage is applied to the input of the amplifier 53.

The $V_A$ and $V_C$ signals which are applied to the input of the amplifier 53, determine the rate at which the cabin altitude servomotor 57 runs. When $V_A$ is equal to $V_C$ the motor 57 is stopped and as the difference between the two signals increases, the motor 57 turns at a faster speed. The direction and speed of rotation of the output shaft of the motor 57 is determined by the respective amplitudes of the two signals which, as applied to the input of amplifier 53, are of opposite polarities.

It is the function of the cabin altitude servo 57 to measure the cabin pressure (altitude) with respect to some other pressure, usually sea level pressure. The desired cabin altitude is controlled by the crew member when he sets the potentiometers 37 and 42, thereby producing the $V_C$ signal, which is supplied to the input of the cabin altitude servo amplifier 53. The cabin altitude is measured in the simulator by means of the servo loop containing the cabin altitude servomotor 57. The output shaft of the servomotor 57 is mechanically linked to the slider arm 82 of a potentiometer 84. One end of the potentiometer 84 is connected to the source of potential 18 and the other end is connected to ground 17. The voltage which is tapped off at the potentiometer 84 is representative of the cabin altitude $h_c$. The potentiometer 84 is shown as representing cabin altitudes between the limits of 0 and 49,000 feet. Under normal operating conditions, the cabin's altitude never rises above 6,700 feet, since above this level, passengers begin to experience discomforting effects. However, if there is a decompression or the compressors fail to operate, or if the outflow valve does not operate, the cabin altitude would reach the aircraft altitude. In the example of the type of aircraft being described, the maximum altitude is 49,000 feet, but the cabin altitude may be any value, depending upon the particular aircraft.

In order to understand the operation of the cabin altitude servomotor 57 and how it measures the cabin altitude $h_c$, consider the case of where the cabin altitude is set to a desired value of 5,000 feet, the aircraft flying a simulated flight plan at a constant altitude, the compressors delivering a fixed quantity of air and the outflow valve being positioned at a point where there is not enough air being let out to keep the 5,000 feet altitude. The last condition named would cause the cabin pressure to increase and the cabin altitude to decrease. In this case the $V_C$ and $V_A$ signals at the input of the amplifier 53 not being equal causes the cabin's altitude servomotor 57 to run at a certain speed, thereby driving the slider arm 82 of the potentiometer 84. The motor 57 continues to run driving the slider arm 82 toward a lower altitude indicator as long as the $V_C$ and $V_A$ signals are not equal. This indicates that the pressure in the cabin is increasing, since not enough air is being let out. On the other hand, if the valve is at a position where too much air is being let out to maintain the cabin altitude of 5,000 feet, the motor 57 runs in the opposite direction and drives the slider arm 82 toward a higher cabin altitude indication, i.e., a lower cabin pressure.

Consider another situation where the $V_A$ signal is correct to maintain a cabin altitude of 5,000 feet at a given aircraft altitude, i.e., $V_A$ equal to $V_C$, and the aircraft altitude is changed, thereby changing the $V_C$ signal. This means that the cabin altitude will change unless the $V_A$ signal is changed, because the valve must be at a new position, as determined by the schedule, in order to maintain the desired cabin altitude of 5,000 feet. When $V_A$ is not equal to $V_C$, the motor 57 runs in the proper direction and indicates the cabin altitude by means of the potentiometer 84.

When a change in conditions occurs, in order to maintain the desired cabin altitude the shaft position of the valve servomotor 64 must be changed in order to change the $V_A$ signal to make it equal to the $V_C$ signal for the new condition. The rate at which the $V_A$ signal is changed is determined by a rate amplifier 85 which is supplied with the actual cabin altitude signal from the slider arm 82 of the potentiometer 84 and the desired cabin altitude signal from the slider arm 43 of the cabin altitude set control potentiometer 42. The rate signal produced by the rate amplifier 85 is combined with the $V_A$ and $V_C$ signals at the input of the valve position servo amplifier and in this manner the rate at which the valve position is changed, and therefore the rate at which the cabin altitude is changed, is established.

The signal which is tapped off the cabin altitude set control 42 by the slider arm 43 is applied through a movable contact arm 87 of a relay 89 to the input of an amplifier 92. The output signal from the amplifier 92, which is the desired cabin altitude signal, passes through a diode 93 and a resistor 95 to the input of the rate amplifier 85. The actual cabin altitude signal is applied from the potentiometer 84 to the input of the rate amplifier 85 through a resistor 96.

The rate amplifier 85 has a negative feedback path through resistor 97. The amplifier 85 is also bridged by the respective diodes 100 and 101 which serve as positive and negative limiters. The anode and cathode of the respective diodes 100 and 101 are biased with a potential from the respective positive and negative sources 18 and 80 by means of the voltage divider networks formed by the resistors 102—102a and 103—103a. The diodes 100 and 101 are biased in a manner so that the rate signal produced by the amplifier 85 cannot exceed a certain level.

The rate amplifier 85 produces a rate signal when the actual cabin altitude, as indicated by the voltage tapped off the potentiometer 84, is not equal to the desired cabin altitude, as established by the crew member in the setting of the potentiometer 42. The latter condition occurs when $V_A$ is not equal to $V_C$. This rate signal appears at the output of the amplifier 85 across a potentiometer 105. The potentiometer 105 is the rate of climb control which is set by the crew member to make the cabin altitude change at a desired rate. By moving the slider arm 106 of the potentiometer 105, different amounts of the rate signal from the amplifier 85 are tapped off and supplied to the input of the valve position servo amplifier 61 through the movable contact arm 108 of a switch 109 and a resistor 110. The amount of rate signal tapped off the rate of climb potentiometer 105 determines the rate at which the shaft of the valve servomotor 64 moves and therefore the rate at which the cabin altitude changes. The potentiometer 105 is calibrated so that the rate signal can produce a cabin rate of climb of between 0 and 800 feet per minute. It should be realized that the term cabin rate of climb can mean that the cabin pressure is either increasing or decreasing, depending upon the simulated flight pattern of the aircraft.

The switch 109 is a rapid pressurization switch which would normally be mounted on the landing gear of the aircraft. In the simulator switch 109 is under the control of the instructor and/or crew member. In the position shown, the rate of climb is determined by the rate of climb control 105. When the switch 109 is depressed, bringing the movable contact 108 down against the lower stationary contact, the signal is fed directly from the output of the rate amplifier 85 to the input of the valve servo amplifier 61. This allows the cabin altitude to change at the maximum rate of 800 feet per minute, so that the aircraft may be pressurized on the ground.

An indication of the cabin rate of climb is provided by means of a cabin rate of climb servomotor 111 and an indicator 112. The servomotor 111, which is of the position type, is driven by a magnetic amplifier 113 which receives its control signal from an amplifier 117. The input of amplifier 117 receives the $V_C$ signal over line 45 through the movable contact 118e of a relay 118 and the resistor 119. The $V_A$ signal is applied to the input of the amplifier 117 through relay contact 118f and resistor 120.

Amplifier 117 is provided with a feedback arrangement formed by the generator 130 and the resistors 131 and 132. Another feedback loop is formed by the resistors 133 and 134. When the $V_A$ signal does not equal to $V_C$ signal at the input of amplifier 117, the output shaft of the servomotor 111 turns to a position indicative of the difference between the two voltages. This means that the rate of climb indicator 112 is also moved to a position which is indicative of the rate of climb.

In certain cases the actual aircraft altitude h, as determined by the altitude servo 23, will be lower than the desired cabin altitude, as determined by the potentiometer 42. For example, considering the case where the crew member has set a desired cabin altitude into the pressurization system when the aircraft is still on the ground, or has just taken off. As the aircraft is climbing, the actual aircraft altitude h may be less than the desired cabin altitude. In order not to subject the passengers to the higher cabin altitudes when it is not necessary, it is desirable to make the cabin altitude $h_c$ follow the aircraft altitude when the desired cabin altitude is greater than the actual aircraft altitude. This is accomplished by supplying a signal to the rate amplifier 85 which is representative of the aircraft altitude h, and comparing this signal with the actual cabin altitude signal from the potentiometer 84. This is accomplished by comparing a signal which is representative of the aircraft altitude h with a signal which is representative of the desired cabin altitude.

The comparison is made in an amplifier 121 which is supplied with an aircraft altitude signal h from a potentiometer 122 whose slider arm 123 is driven by a mechanical linkage 20c of the altitude servo 23. The upper end of the potentiometer 122 is connected to the source of voltage 80 and the lower end is connected to ground 17. The desired cabin altitude signal is supplied to the amplifier 121 from the center arm 43 of the cabin altitude set control potentiometer 42.

When the signal from the potentiometer 42 is greater in magnitude than the signal from the potentiometer 122 slider arm 123, the amplifier 121 conducts and there is a current flow through the diode 125, the resistor 126 and the relay coil 89. When the relay coil 89 is energized, the relay contacts 87 and 87a move down. This takes the signal from the cabin altitude set control 42 off of the input of the amplifier 92 and applies an altitude signal h from a potentiometer 128. The center arm 129 of the potentiometer is driven by a mechanical linkage 20d from the altitude servo 23. The altitude signal h is then compared with the signal from the potentiometer 84, the actual cabin altitude, at the rate amplifier 85. In this manner, the aircraft altitude signal is used as the reference voltage for the rate amplifier 85 instead of the desired cabin altitude voltage.

In simulated operation, assume that the potentiometer has been set to a desired cabin altitude of 5,000 feet. As the aircraft climbs and is below 5,000 feet, the aircraft altitude signal h controls the cabin rate of climb. Once the aircraft is above 5,000 feet, the relay 89 is de-energized and the signal from the cabin altitude set control 42, controls the cabin rate of climb in the manner previously described. When the aircraft is descending, the signal from the potentiometer 42 controls the cabin rate of climb (descent) until the aircraft reaches 5,000 feet. At that level, relay 89 is energized and the aircraft altitude signal h, determines the cabin rate of climb (descent).

It is desirable to avoid exceeding a predetermined maximum pressure differential between the cabin pressure (altitude) and the outside, or aircraft, pressure (altitude) so that the structural limitations of the aircraft will not be exceeded. In the present system this pressure differential is chosen to be 8.77 pounds per square inch, which approximates a pressure differential between inside cabin pressure and outside air pressure of 22,500 feet. The avoidance of exceeding the maximum pressure differential is accomplished by increasing the cabin pressure at the outside pressure increases so as not to exceed the maximum allowable differential.

The maximum pressure differential effect is simulated in the system of the present invention by comparing the signal from the cabin altitude set potentiometer 42 with the signal of the aircraft altitude h from the potentiometer 122 at the diode 93. When the difference in the two signals indicate that the altitude differential is greater than 22,500 feet (pressure differential greater than 8.77 p.s.i.), the altitude signal h instead of the signal for the potentiometer 42 passes to the rate amplifier 85. The cabin rate of climb now follows the aircraft altitude h, while maintaining the 8.77 p.s.i. differential.

Should the differential pressure increase beyond 8.77 p.s.i. for some reason, a cabin pressure relief valve is set to operate at 9.2 p.s.i. and also to sound a warning horn (not shown). The cabin pressure relief valve (not shown) is controlled by an amplifier 140 and a relay 141. The input of amplifier 140 receives a reference signal from the source 18 by means of the voltage divider network formed by resistors 143a, 143b, 143c. The amplifier 140 also receives signals from the actual cabin altitude potentiometer 84 through resistor 144 and the actual altitude h, from the potentiometer 128 through a resistor 145. When the sum of these three signals indicates that the pressure differential is greater than 9.2 p.s.i. the relay 141 is energized, which opens the pressure relief valve and sounds the warning horn.

To summarize the operation of the system, the signals applied to the rate amplifier 85 are such that during a simulated flight plan of ascent the cabin rate of climb follows the aircraft rate of climb until the aircraft reaches the desired cabin altitude. The cabin rate of climb then is controlled by the rate of climb potentiometer 105, keeping the cabin at the desired altitude as the aircraft increases its altitude. When the aircraft reaches an altitude such that the differential pressure between the cabin and the outside is equal to 8.77 p.s.i., the cabin altitude increases as the aircraft altitude increases, in order to maintain this differential.

When the aircraft descends, the operation of the system is reversed. The 8.77 p.s.i. differential is maintained until the actual differential pressure is less than 8.77 p.s.i. The cabin altitude then descends under the control of the signal from the potentiometer 105 until the cabin altitude is greater than the aircraft altitude. At this point, the cabin altitude follows the aircraft altitude down.

In order to provide an indication of the outflow valve position, the output shaft of the valve position servomotor 64 also drives an indicator handle 114 through a gear box 115 and a mechanical clutch 116. This is accomplished by a conventional mechanical coupling. Provision is also made in the simulator to manually control the position of the output shaft of the servomotor 64 by means of the control handle indicator 114. This is accomplished by means of a switch 120 which is under the control of the instructor. The switch 120 is in series with the power supply for the magnetic amplifier 63. When the switch 120 is open the magnetic amplifier 63 is disabled and the $V_A$, $V_C$ and rate signals are rendered ineffective to drive the motor. The position of the output shaft of the motor 64 is now under the mechanical control of the indicator handle 114, which is operated by the crew member. The crew member can now control the cabin pressure and the cabin rate of climb by varying the position of the indicator handle 114.

The present system is also designed to simulate abnormal conditions and to teach the crew member to deal with them. One such abnormal condition is cabin decompression, the simulated condition of which may be introduced into the simulator by the instructor. This is done by means of a switch 150 which energizes relay 118. When relay 118 is energized the simulated aircraft altitude signal $h$ is applied from the potentiometer 128 through resistor 152, relay contact 118a and resistor 153 to the input of the cabin altitude servo-amplifier 53. The amplifier also receives the cabin altitude signal $h_c$ from a potentiometer 155 whose slider arm 156 is driven by the output shaft of the cabin altitude servomotor 57. The $h_c$ signal is applied through resistor 158 to a voltage divider network formed by resistors 159 and 159a. The signal is tapped off the voltage divider and applied to the amplifier 53 through relay contact 118b and resistor 160. When relay 118 operates, relay contacts 118c and 118d are grounded, thereby removing the $V_A$ and $V_C$ signals from the input of the amplifier 53.

Under these conditions, the system operates to make the cabin altitude equal to the aircraft altitude. Since the aircraft altitude signal $h$ indicates a higher altitude than the cabin, the slider arm 82 of the potentiometer 84 is driven upward to supply a signal to the rate amplifier 85 which causes the valve position servo 64 to turn in a direction which would be indicative of a more open position. This simulates the equalization of the cabin and the aircraft altitudes. When the relay 118 operates, contact 118h is grounded, thereby deactivating the limiters 100 and 101 so that a maximum rate signal is produced. Therefore, the equalization takes place more rapidly than the normal cabin rate.

The operation of the cabin rate of climb servo 111 is also altered when the relay 118 is energized. In this instance, relay contacts 118e and 118f are grounded and the $V_A$ and $V_C$ signals are removed from the input of amplifier 117. The input of amplifier 117 is supplied with the voltage produced by the generator 59 which is driven by the cabin altitude servo-motor 57. The output of the generator 59 is connected to amplifier 117 through relay contact 118g and resistor 163. The cabin rate of climb servo-motor 111 therefore drives the indicator 112 at a rate which is determined by the output voltage of the generator 59.

Provision is also made for detecting the condition where the cabin altitude is greater than the aircraft altitude and for limiting the operation of the system so that this condition is not maintained. This is accomplished by the amplifier 170 which compares the aircraft altitude signal $h$ from potentiometer 128 with the actual cabin altitude signal from the potentiometer 155. When the cabin altitude signal $h$ is greater than the altitude signal, the amplifier 170 causes a current to flow in a relay coil 171 which is in series circuit with a diode 173, a resistor 172 and ground. When the coil 171 has current flowing in it, relay contact 118b is closed and the cabin altitude signal from potentiometer 155 is supplied to the amplifier 53 in addition to the $V_A$ and $V_C$ signals. This causes the cabin altitude servo-motor 57 to turn in a direction to reduce the cabin altitude. The cabin rate of climb circuit, as controlled by the rate amplifier 85, functions in response to the signal from the potentiometer 84 in the manner previously described.

Therefore it is seen that a simulator system has been provided which is capable of simulating all of the operations of a cabin pressurization system of the variable position outflow valve type. The system allows training of the aircraft crew members in the uses of the pressurization system under the supervision of instructors, while on the ground.

While a preferred embodiment of the invention has been described above it will be understood that this embodiment is illustrative only and the invention is to be limited solely by the appended claims.

What is claimed is:

1. A simulated aircraft cabin pressurization system of the variable position outflow valve type comprising means for deriving a signal representative of the scheduled position of the valve for a set of conditions, means for deriving a signal representative of the actual position of the valve, and means for varying said actual valve position signal to equal said scheduled valve position signal.

2. A simulated aircraft cabin pressurization system of the variable position outflow valve type comprising means for deriving a signal representative of the scheduled position of the valve for a set of conditions, means for deriving a signal representative of the actual position of the valve, and means for varying said actual valve position signal at a predetermined rate to equal said scheduled valve position signal.

3. A simulated aircraft cabin pressurization system of the variable position outflow valve type comprising means for deriving a signal representative of the scheduled valve position for a set of conditions, means for varying said conditions, means for deriving a signal representative of the actual position of the valve and means for varying the actual valve position signal in response to a change in conditions to equal said scheduled valve position signal.

4. A simulated pressurization system as set forth in claim 3, wherein the variation of the actual valve position signal to equal the scheduled valve position signal is accomplished at a predetermined rate.

5. A simulated aircraft cabin pressurization system of the variable position outflow valve type comprising means for deriving a signal representative of the scheduled valve position for any simulated altitude of the aircraft, means for changing the simulated altitude of the aircraft to vary the scheduled valve position signal, means for deriving a signal representative of the actual position of the outflow valve, and means for varying the actual valve position signal to equal the scheduled valve position signal in response to a change in the computed valve position signal.

6. A simulated pressurization system as set forth in claim 5, wherein the variation of the actual valve position signal to equal the scheduled valve position signal is accomplished at a predetermined rate.

7. A simulated pressurization system as set forth in claim 5, wherein the scheduled valve position signal also varies as a function of the simulated cabin pressure which is desired to be maintained in the aircraft.

8. A simulated cabin pressurization system as set forth in claim 5, wherein means are provided to change the scheduled valve position signal to simulate that one or more of the aircraft compressors is not running.

9. A simulated aircraft cabin pressurization system of the variable position outflow valve type comprising means for establishing a desired simulated aircraft cabin altitude, said means including means for deriving a signal representative of the scheduled position of the outflow valve for a set of simulated aircraft conditions, means for deriving a signal representative of the actual position of the outflow valve, and means for varying the actual valve position signal to equal the scheduled valve position signal thereby maintaining the desired simulated aircraft cabin altitude.

10. A simulated cabin pressurization system as set forth in claim 9, wherein the actual valve position signal is varied at a predetermined rate to equal the computed valve position signal thereby varying the simulated aircraft cabin altitude at the said predetermined rate to maintain the desired simulated aircraft cabin altitude.

11. A simulated cabin pressurization system as set forth in claim 10, wherein means are provided to adjust the predetermined rate to a desired value.

12. A simulated aircraft cabin pressurization system of the variable position outflow valve type comprising means for establishing a desired simulated aircraft cabin altitude, said last named means including means for deriving a signal representative of the scheduled position of the outflow valve for the desired simulated cabin altitude at simulated altitudes of the aircraft, means for deriving a signal representative of the actual position of the outflow valve, and means for varying the actual valve position signal to equal said scheduled valve position signal thereby maintaining the desired simulated aircraft cabin altitude.

13. A simulated pressurization system as set forth in claim 12, wherein the variation of the actual valve position signal to equal the scheduled valve position signal is accomplished at a predetermined rate thereby varying the simulated aircraft cabin altitude at the said predetermined rate to maintain the desired simulated aircraft cabin altitude.

14. A simulated aircraft cabin pressurization system of the variable position outflow valve type comprising means for establishing a desired simulated aircraft cabin altitude, said last named means including means for deriving a signal representative of the scheduled position of the outflow valve for the desired simulated cabin altitude at simulated altitudes of the aircraft, means for varying the simulated altitude of the aircraft thereby varying the scheduled valve position signal, and means for varying the actual valve position signal to equal said scheduled valve position signal thereby maintaining the desired simulated aircraft cabin altitude.

15. A simulated pressurization system as set forth in claim 14, wherein the variation of the actual valve position signal to equal the scheduled valve position signal is accomplished at a predetermined rate thereby varying the simulated aircraft cabin altitude at the said predetermined rate to maintain the desired simulated aircraft cabin altitude.

16. A simulated aircraft cabin pressurization system of the variable position outflow valve type comprising means for establishing a desired simulated aircraft cabin altitude, said last named means including means for deriving a signal representative of the scheduled position of the outflow valve for the desired simulated cabin altitude under a variety of simulated aircraft conditions, means for deriving a signal representative of the actual valve position, the desired simulated cabin altitude being correct under any given set of conditions only when the scheduled valve position signal has a predetermined relationship to the actual valve position signal, means for determining when the scheduled valve position signal does not have the said predetermined relationship to the actual valve position signal, and means operative in response to said determining means for varying the actual valve position signal to achieve the said predetermined relationship with the scheduled valve position signal thereby maintaining the desired simulated aircraft cabin altitude.

17. A simulated cabin pressurization system as set forth in claim 16, wherein the actual valve position signal is varied to achieve the said predetermined relationship with the scheduled valve position signal at a predetermined rate thereby changing the simulated cabin altitude at the predetermined rate to maintain the desired simulated aircraft cabin altitude.

18. A simulated cabin pressurization system as set forth in claim 16, wherein means are provided for changing the simulated aircraft conditions to change the scheduled valve position signal.

19. A simulated cabin pressurization system as set forth in claim 18, wherein one of the means for changing the simulated aircraft conditions includes a means for varying the simulated altitude of the aircraft.

20. A simulated cabin pressurization system of the variable position outflow valve type comprising means for providing a simulated flight pattern for the aircraft, said last named means including means for varying the simulated altitude of the aircraft, means for setting a desired simulated cabin altitude into the system, means for deriving a signal representative of the scheduled position of the outflow valve at all simulated altitudes of the aircraft, means for deriving a signal representative of the actual position of the outflow valve, the desired simulated cabin altitude being correct at any given altitude only when the scheduled valve position signal has a predetermined relationship to the actual valve position signal, means for changing the actual valve position signal to maintain said predetermined relationship to the scheduled valve position signal thereby maintaining the desired simulated cabin altitude, said last named means including means for varying the actual valve position signal under the control of the simulated aircraft altitude when the simulated aircraft altitude is less than the desired cabin altitude, means for varying the actual valve position signal at a predetermined rate to equal the scheduled valve position signal when the simulated aircraft altitude is greater than the desired cabin altitude, thereby changing the cabin altitude at the predetermined rate to maintain the desired simulated cabin altitude, means for determining when a predetermined simulated pressure differential exists between the simulated cabin altitude and the simulated aircraft altitude, and means for maintaining the simulated pressure differential constant as the simulated aircraft altitude increases.

21. A simulated cabin pressurization system of the variable position outflow valve type comprising means for providing a simulated flight pattern for the aircraft, said last named means including means for varying the simulated altitude of the aircraft, means for setting a desired simulated cabin altitude into the system, means for deriving a signal representative of the scheduled position of the outflow valve at all simulated altitudes of the aircraft, means for deriving a signal representative of the actual position of the outflow valve, the desired simulated cabin altitude being correct at any given altitude only when the scheduled valve position signal has a predetermined relationship to the actual valve position signal, means for changing the actual valve position signal to maintain said predetermined relationship to the scheduled valve position signal, thereby maintaining the desired simulated cabin altitude, said last named means including means for varying the actual valve position signal under the control of the simulated aircraft altitude when the simulated aircraft altitude is less than the desired cabin altitude, means for varying the actual valve position signal at a predetermined rate to equal the scheduled valve position signal when the simulated aircraft altitude is greater than the desired cabin altitude, thereby changing the cabin altitude at the predetermined rate to maintain the desired simulated cabin altitude, means for determining when a predetermined simulated pressure differential exists between the simulated cabin altitude and the simulated aircraft altitude, means for maintaining the simulated pressure differential constant as the simulated aircraft altitude increases, and means for simulating the operation of a pressure relief valve when said predetermined pressure differential is exceeded to increase said simulated cabin altitude.

References Cited in the file of this patent

UNITED STATES PATENTS 2,724,192    Stern et al. _____ Nov. 22, 1955

FOREIGN PATENTS 809,608    Great Britain _____ Feb. 25, 1959